US012677178B2

(12) United States Patent
Sun et al.

(10) Patent No.: US 12,677,178 B2
(45) Date of Patent: Jul. 7, 2026

(54) LOAD QUERY PROCESSING METHOD AND APPARATUS, STORAGE MEDIUM AND ELECTRONIC APPARATUS

(71) Applicant: ZTE Corporation, Shenzhen (CN)

(72) Inventors: Shanshan Sun, Shenzhen (CN); Jinzhao He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 306 days.

(21) Appl. No.: 18/284,945

(22) PCT Filed: Mar. 11, 2022

(86) PCT No.: PCT/CN2022/080428
§ 371 (c)(1),
(2) Date: Sep. 29, 2023

(87) PCT Pub. No.: WO2022/206343
PCT Pub. Date: Oct. 6, 2022

(65) Prior Publication Data
US 2024/0187904 A1      Jun. 6, 2024

(30) Foreign Application Priority Data

Mar. 29, 2021      (CN) .......................... 202110336719.2

(51) Int. Cl.
*H04W 24/10*          (2009.01)
*H04W 24/04*          (2009.01)
*H04W 76/19*          (2018.01)

(52) U.S. Cl.
CPC ........... *H04W 24/10* (2013.01); *H04W 24/04* (2013.01); *H04W 76/19* (2018.02)

(58) Field of Classification Search
CPC ..... H04W 24/10; H04W 24/04; H04W 76/19; H04W 76/10

(Continued)

(56) References Cited

U.S. PATENT DOCUMENTS

2013/0163424 A1*   6/2013   Goerke ................. H04W 24/02
                                                                 370/328
2016/0119809 A1     4/2016   Lee et al.
(Continued)

FOREIGN PATENT DOCUMENTS

CN          102098718 A       6/2011
CN          102685811 A       9/2012
(Continued)

OTHER PUBLICATIONS

International Search Report for corresponding PCT/CN2022/080428 filed Mar. 11, 2022; Mail date May 19, 2022.
(Continued)

*Primary Examiner* — Chandrahas B Patel
*Assistant Examiner* — Meheret Woldegebreal Kidane
(74) *Attorney, Agent, or Firm* — CANTOR COLBURN LLP

(57) ABSTRACT

Provided are a load query processing method and apparatus, a storage medium, and an electronic apparatus. The method includes: receiving a load query response sent by a target base station and used for responding to a first load query request, wherein the load query request carries cell identifiers to be queried; recording a load receiving situation of load receiving in each period within a preset number of periods; determining a failure cell list for which load query fails according to the load receiving situation and the load query response, wherein the failure cell list comprises a failure cell identifier and a corresponding failure cause; and processing a failure cell corresponding to the failure cell identifier according to the failure cell list.

18 Claims, 5 Drawing Sheets

Receive a load query response sent by a target base station and used for responding to a first load query request, wherein the load query request carries cell identifiers to be queried — S202

Record a load receiving situation of load receiving in each period within a preset number of periods — S204

Determine a failure cell list for which load query fails according to the load receiving situation and the load query response, wherein the failure cell list includes a failure cell identifier and a corresponding failure cause — S206

Process a failure cell corresponding to the failure cell identifier according to the failure cell list — S208

(58) Field of Classification Search
USPC ........................................................ 370/252
See application file for complete search history.

(56) References Cited

U.S. PATENT DOCUMENTS

| | | | | |
|---|---|---|---|---|
| 2019/0320436 A1* | 10/2019 | Han | ..................... | H04W 72/53 |
| 2020/0045583 A1 | 2/2020 | Kim et al. | | |

FOREIGN PATENT DOCUMENTS

| | | | |
|---|---|---|---|
| CN | 103581875 | A | 2/2014 |
| CN | 106304192 | A | 1/2017 |
| CN | 112449357 | A | 3/2021 |
| EP | 2337395 | A1 | 6/2011 |
| EP | 2381715 | A1 | 10/2011 |
| EP | 3554124 | A1 | 10/2019 |
| WO | 2010081326 | A1 | 7/2010 |

OTHER PUBLICATIONS

European Search Report for corresponding application EP22778527; Report dated Aug. 21, 2024.
Chinese Office Action; Application No. 202110336917.2; Filing Date: Mar. 29, 2021; date of mailing: Mar. 31, 2026; 13 pages.

* cited by examiner

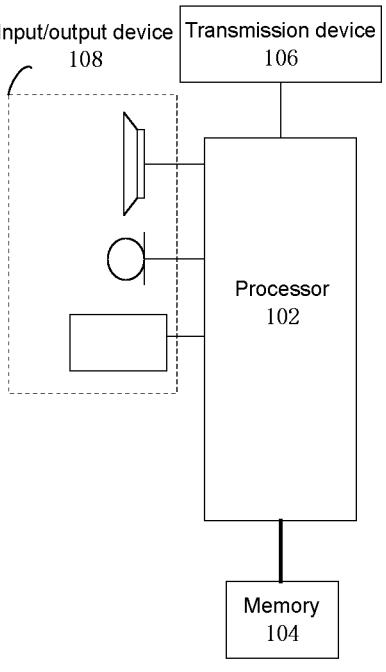

Fig. 1

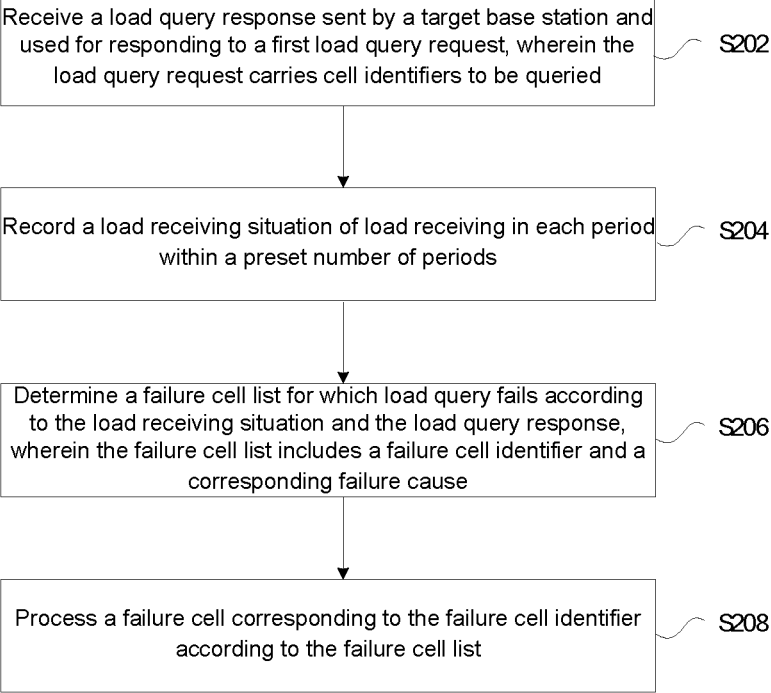

Receive a load query response sent by a target base station and used for responding to a first load query request, wherein the load query request carries cell identifiers to be queried — S202

Record a load receiving situation of load receiving in each period within a preset number of periods — S204

Determine a failure cell list for which load query fails according to the load receiving situation and the load query response, wherein the failure cell list includes a failure cell identifier and a corresponding failure cause — S206

Process a failure cell corresponding to the failure cell identifier according to the failure cell list — S208

Fig. 2

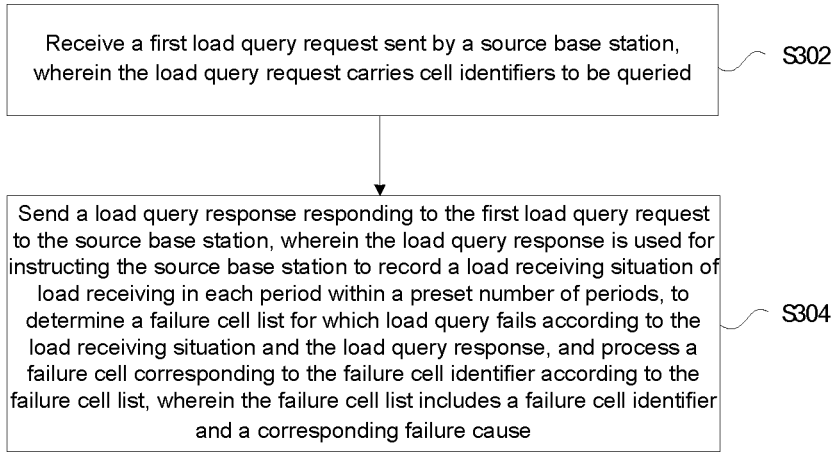

Receive a first load query request sent by a source base station, wherein the load query request carries cell identifiers to be queried — S302

Send a load query response responding to the first load query request to the source base station, wherein the load query response is used for instructing the source base station to record a load receiving situation of load receiving in each period within a preset number of periods, to determine a failure cell list for which load query fails according to the load receiving situation and the load query response, and process a failure cell corresponding to the failure cell identifier according to the failure cell list, wherein the failure cell list includes a failure cell identifier and a corresponding failure cause — S304

Fig. 3

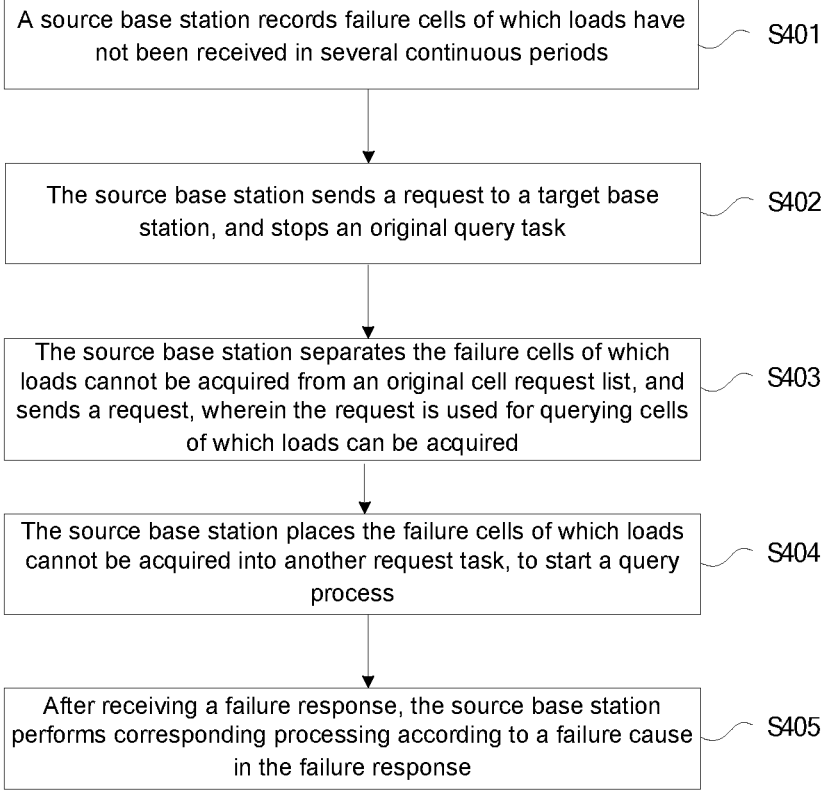

A source base station records failure cells of which loads have not been received in several continuous periods — S401

The source base station sends a request to a target base station, and stops an original query task — S402

The source base station separates the failure cells of which loads cannot be acquired from an original cell request list, and sends a request, wherein the request is used for querying cells of which loads can be acquired — S403

The source base station places the failure cells of which loads cannot be acquired into another request task, to start a query process — S404

After receiving a failure response, the source base station performs corresponding processing according to a failure cause in the failure response — S405

Fig. 4

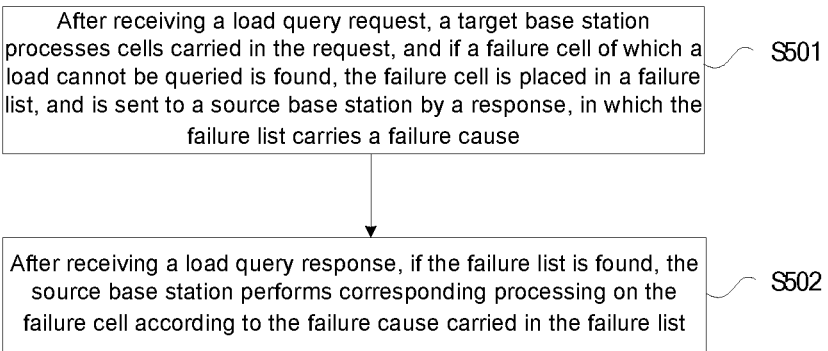

After receiving a load query request, a target base station processes cells carried in the request, and if a failure cell of which a load cannot be queried is found, the failure cell is placed in a failure list, and is sent to a source base station by a response, in which the failure list carries a failure cause    S501

After receiving a load query response, if the failure list is found, the source base station performs corresponding processing on the failure cell according to the failure cause carried in the failure list    S502

Fig. 5

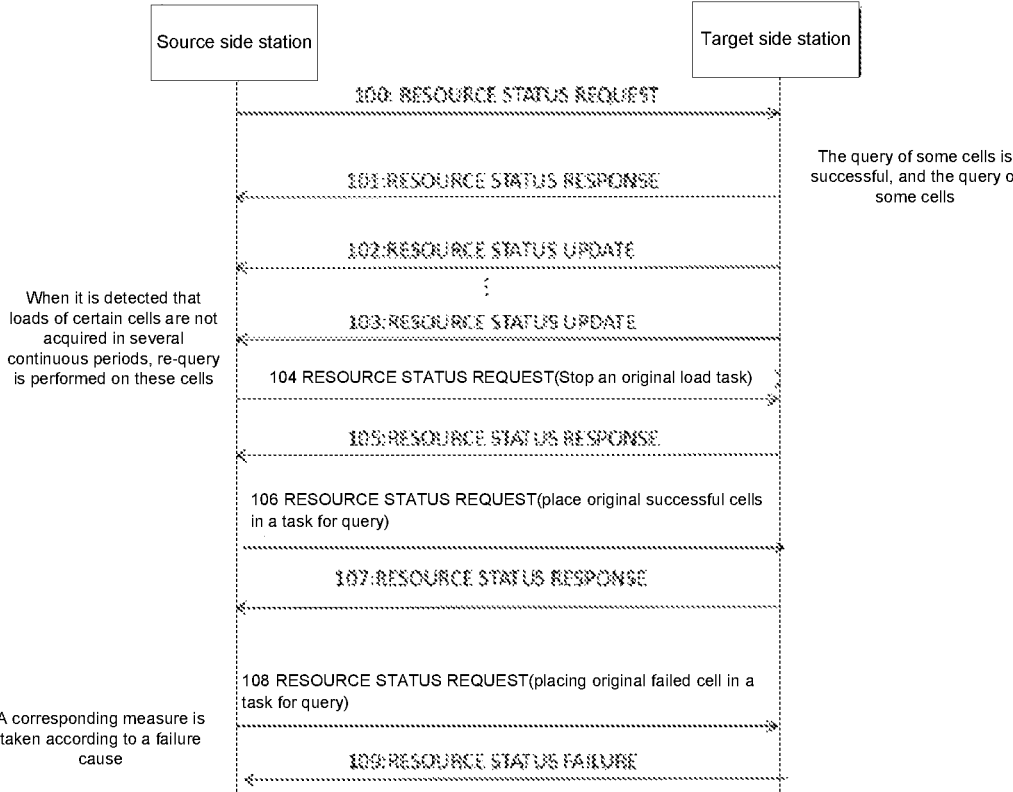

Fig. 6

LOAD QUERY PROCESSING METHOD AND APPARATUS, STORAGE MEDIUM AND ELECTRONIC APPARATUS

CROSS-REFERENCE TO RELATED DISCLOSURE

The present disclosure is based on Chinese patent application No. CN 202110336719.2 filed on Mar. 29, 2021 and entitled "Load Query Processing Method and Apparatus, Storage Medium and Electronic Apparatus", and claims priority to the Chinese patent application, the disclosure of which is incorporated herein by reference in its entirety.

TECHNICAL FIELD

Embodiments of the present disclosure relate to the field of communications, and in particular, to a load query processing method and apparatus, a storage medium, and an electronic apparatus.

BACKGROUND

An XN load collection process defined in R16 protocol includes request, response, and load reporting. The request carries a query load type and cells to be queried. The response includes two types: a successful response, which is a load status response, i.e. RESOURCE STATUS RESPONSE and indicates that the response for all or some of the cells carried in the request is successful; and a failed response, which is a load status error, i.e. RESOURCE STATUS FAILURE and indicates that the query for all cells carried in the request fails.

If the response of some cells in the request is successful, a peer end will reply RESOURCE STATUS RESPONSE, but which cells achieve successful response and which cells achieve failed response cannot be distinguished according to the content of the RESOURCE STATUS RESPONSE. As a result, a source side query station cannot acquire the loads of some cells all the time, thereby affecting the service.

Regarding the problem in the related art that cells with successful response and cells with failed response cannot be distinguished according to the content of the resource status response, which renders that a source base station cannot acquire the loads of some cells all the time, thereby affecting the service, no solution has been proposed.

SUMMARY

Embodiments of the present disclosure provide a load query processing method and apparatus, a storage medium, and an electronic apparatus, so as to at least solve the problem in the related art that cells with successful response and cells with failed response cannot be distinguished according to the content of the resource status response, which renders that a source base station cannot acquire the loads of some cells all the time, thereby affecting the service.

According to some embodiments of the present disclosure, provided is a load query processing method, the method includes:

a load query response sent by a target base station and used for responding to a first load query request is received, wherein the load query request carries cell identifiers to be queried;

a load receiving situation of load receiving in each period within a preset number of periods is recorded;

a failure cell list for which load query fails is determined according to the load receiving situation and the load query response, wherein the failure cell list includes a failure cell identifier and a corresponding failure cause; and a failure cell corresponding to the failure cell identifier is processed according to the failure cell list.

In some exemplary embodiments, the step that a failure cell list for which load query fails is determined according to the load receiving situation and the load query response includes:

in a case where the load is received in each period within the preset number of periods, and the load query response carries the failure cell list, the failure cell list is identified according to the load query response; and in a case where the load is received in each period within the preset number of periods, and the load query response does not carry the failure cell list, a failure cell identifier for which load query fails and the corresponding failure cause are determined according to the received load, and the failure cell identifier and the corresponding failure cause are added to the failure cell list.

In some exemplary embodiments, the step that a failure cell identifier for which load query fails and the corresponding failure cause are determined according to the received load includes:

a target cell identifier corresponding to the received load is acquired;

in a case where the target cell identifier is not completely the same as the cell identifiers to be queried, the failure cell identifier of which the load has not been received is determined according to the cell identifiers to be queried; and the failure cause corresponding to the failure cell identifier is determined according to the failure cell identifier.

In some exemplary embodiments, the step that the corresponding failure cause of the failure cell identifier is determined according to the failure cell identifier includes:

a second load query request for acquiring a load of the failure cell identifier is sent to the target base station, wherein the second load query request carries the failure cell identifier;

a load query failure report sent by the target base station is received, wherein the load query failure report carries the failure cause corresponding to the failure cell identifier; and the failure cell identifier and the corresponding failure cause are determined according to the load query failure report.

In some exemplary embodiments, the step that a failure cell list for which load query fails is determined according to the load receiving situation and the load query response includes:

in a case where the load is not received in each period within the preset number of periods, a connection with the target base station is reestablished, and the load of each cell identifier to be queried is queried from the target base station according to the reestablished connection.

In some exemplary embodiments, the steps that a connection with the target base station is reestablished, and the load of each cell identifier to be queried is queried from the target base station according to the reestablished connection include:

if the target cell identifier is completely the same as the cell identifiers to be queried, a load query stopping request is sent to the target base station; and after receiving a load query stopping response returned by the target base station, the load of each cell identifier to be queried is queried from the target base station in a manner of resending the first load query request to the target base station.

According to some other embodiments of the present disclosure, further provided is a load query processing method, the method including:

a first load query request sent by a source base station is received, wherein the load query request carries cell identifiers to be queried; and a load query response responding to the first load query request is sent to the source base station, wherein the load query response is used for instructing the source base station to record a load receiving situation of load receiving in each period within a preset number of periods, to determine a failure cell list for which load query fails according to the load receiving situation and the load query response, and process a failure cell corresponding to the failure cell identifier according to the failure cell list, wherein the failure cell list includes a failure cell identifier and a corresponding failure cause.

In some exemplary embodiments, the method further includes:

in a case where the load is received in each period within the preset number of periods, and the load query response does not carry the failure cell list, a load of a target cell identifier is sent to the source base station, wherein the load of the target cell identifier is used for instructing the source base station to determine the failure cell identifier of which the load has not been received according to the cell identifiers to be queried in a case where the target cell identifier is not completely the same as the cell identifiers to be queried, to determine the failure cause corresponding to the failure cell identifier according to the failure cell identifier, and to add the failure cell identifier and the corresponding failure cause to the failure cell list; and in a case where the load is received in each period within the preset number of periods, and the load query response carries the failure cell list, the load query response is used for instructing the source base station to identify the failure cell list.

In some exemplary embodiments, the method further includes:

a second load query request for acquiring a load of the failure cell identifier and sent by the source base station is received, wherein the second load query request carries the failure cell identifier; and a load query failure report is sent to the source base station, wherein the load query failure report is used for instructing the source base station to determine the failure cell identifier and the corresponding failure cause, and the load query failure report carries the failure cause corresponding to the failure cell identifier.

In some exemplary embodiments, the method further includes:

in a case where the load is not received in each period within the preset number of periods, a connection with the source base station is reestablished, and the load of each cell identifier to be queried is provided to the source base station according to the reestablished connection.

In some exemplary embodiments, the steps that a connection with the source base station is reestablished, and the load of each cell identifier to be queried is provided to the source base station according to the reestablished connection include:

if the target cell identifier is completely the same as the cell identifiers to be queried, a load query stopping request sent by the source base station is received; and after returning a load query stopping response to the source base station, the load of each cell identifier to be queried is provided to the source base station in a manner of receiving the first load query request resent by the source base station.

According to some other embodiments of the present disclosure, further provided is a load query processing apparatus, the apparatus includes:

a first receiving module, configured to receive a load query response sent by a target base station and used for responding to a first load query request, wherein the load query request carries cell identifiers to be queried;

a recording module, configured to record a load receiving situation of load receiving in each period within a preset number of periods;

a determination module, configured to determine a failure cell list for which load query fails according to the load receiving situation and the load query response, wherein the failure cell list includes a failure cell identifier and a corresponding failure cause; and a processing module, configured to process a failure cell corresponding to the failure cell identifier according to the failure cell list.

In some exemplary embodiments, the determination module includes:

an identification sub-module, configured to identify the failure cell list according to the load query response in a case where the load is received in each period within the preset number of periods, and the load query response carries the failure cell list; and a determination sub-module, configured to determine a failure cell identifier for which load query fails and the corresponding failure cause according to the received load in a case where the load is received in each period within the preset number of periods, and the load query response does not carry the failure cell list, and add the failure cell identifier and the corresponding failure cause to the failure cell list.

In some exemplary embodiments, the determination sub-module includes:

an acquisition unit, configured to acquire a target cell identifier corresponding to the received load;

a first determination unit, configured to determine the failure cell identifier of which the load has not been received according to the cell identifiers to be queried in a case where the target cell identifier is not completely the same as the cell identifiers to be queried; and a second determination unit, configured to determine the failure cause corresponding to the failure cell identifier according to the failure cell identifier.

In some exemplary embodiments, the second determination unit is further configured to send a second load query request for acquiring a load of the failure cell identifier to the target base station, wherein the second load query request carries the failure cell identifier;

receive a load query failure report sent by the target base station, wherein the load query failure report carries the failure cause corresponding to the failure cell identifier; and determine the failure cell identifier and the corresponding failure cause according to the load query failure report.

In some exemplary embodiments, the determination module includes:

a query sub-module, configured to reestablish a connection with the target base station in a case where the load is not received in each period within the preset number of periods, and query the load of each cell identifier to be queried from the target base station according to the reestablished connection.

In some exemplary embodiments, the query sub-module includes:

a sending unit, configured to send a load query stopping request to the target base station if the target cell identifier is completely the same as the cell identifiers to be queried; and a query unit, configured to query the load of each cell identifier to be queried from the target base station in a manner of resending the first load query request to the target base station after receiving a load query stopping response returned by the target base station.

According to some other embodiments of the present disclosure, further provided is a load query processing apparatus, the apparatus includes:

a second receiving module, configured to receive a first load query request sent by a source base station, wherein the load query request carries cell identifiers to be queried; and a first sending module, configured to send a load query response responding to the first load query request to the source base station, wherein the load query response is used for instructing the source base station to record a load receiving situation of load receiving in each period within a preset number of periods, to determine a failure cell list for which load query fails according to the load receiving situation and the load query response, and process a failure cell corresponding to the failure cell identifier according to the failure cell list, wherein the failure cell list includes a failure cell identifier and a corresponding failure cause.

In some exemplary embodiments, the apparatus further includes:

a second sending module, configured to send a load of a target cell identifier to the source base station in a case where the load is received in each period within the preset number of periods, and the load query response does not carry the failure cell list, wherein the load of the target cell identifier is used for instructing the source base station to determine the failure cell identifier of which the load has not been received according to the cell identifiers to be queried in a case where the target cell identifier is not completely the same as the cell identifiers to be queried, to determine the failure cause corresponding to the failure cell identifier according to the failure cell identifier, and to add the failure cell identifier and the corresponding failure cause to the failure cell list; and in a case where the load is received in each period within the preset number of periods, and the load query response carries the failure cell list, the load query response is used for instructing the source base station to identify the failure cell list.

In some exemplary embodiments, the apparatus further includes:

a third receiving module, configured to receive a second load query request for acquiring a load of the failure cell identifier and sent by the source base station, wherein the second load query request carries the failure cell identifier; and a third sending module, configured to send a load query failure report to the source base station, wherein the load query failure report is used for instructing the source base station to determine the failure cell identifier and the corresponding failure cause, and the load query failure report carries the failure cause corresponding to the failure cell identifier.

In some exemplary embodiments, the apparatus further includes:

a connection establishment module, configured to reestablish a connection with the source base station in a case where the load is not received in each period within the preset number of periods, and provide the load of each cell identifier to be queried to the source base station according to the reestablished connection.

In some exemplary embodiments, the connection establishment module includes:

a receiving sub-module, configured to receive a load query stopping request sent by the source base station if the target cell identifier is completely the same as the cell identifiers to be queried; and a providing sub-module, configured to provide the load of each cell identifier to be queried to the source base station in a manner of receiving the first load query request resent by the source base station after returning a load query stopping response to the source base station.

According to still some other embodiments of the present disclosure, further provided is a computer-readable storage medium, the storage medium storing a computer program, wherein the computer program is configured to execute, when running, the steps in any one of the method embodiments above.

According to still some other embodiments of the present disclosure, further provided is an electronic apparatus, including a memory and a processor; wherein the memory stores a computer program, and the processor is configured to run the computer program to execute the steps in any one of the method embodiments above.

In embodiments of the present disclosure, a load query response sent by a target base station and used for responding to a first load query request is received, wherein the load query request carries cell identifiers to be queried; a load receiving situation of load receiving in each period within a preset number of periods is recorded; a failure cell list for which load query fails is determined according to the load receiving situation and the load query response, wherein the failure cell list includes a failure cell identifier and a corresponding failure cause; and a failure cell corresponding to the failure cell identifier is processed according to the failure cell list, which can solve the problem in the related art that cells with successful response and cells with failed response cannot be distinguished according to the content of the resource status response, which renders that a source base station cannot acquire the loads of some cells all the time, thereby affecting the service. A load receiving situation of load receiving in each period within a preset number of periods is recorded, a failure cell list for which load query fails is determined according to the load receiving situation and the load query response, and the failure cell list is processed, which can effectively reduce the effect of cells having failed response on the service.

BRIEF DESCRIPTION OF THE DRAWINGS

FIG. 1 is a structural block diagram of hardware of a mobile terminal for a load query processing method according to embodiments of the present disclosure;

FIG. 2 is a flowchart I of a load query processing method according to an embodiment of the present disclosure;

FIG. 3 is a flowchart II of a load query processing method according to an embodiment of the present disclosure;

FIG. 4 is a flowchart I of improving the reliability of an XN interactive load according to an embodiment of the present disclosure;

FIG. 5 is a flowchart II of improving the reliability of an XN interactive load according to an embodiment of the present disclosure;

FIG. 6 is a flowchart I of a scenario in which a target base station successfully queries a load according to an embodiment of the present disclosure;

DETAILED DESCRIPTION OF THE EMBODIMENTS

Figure 7:
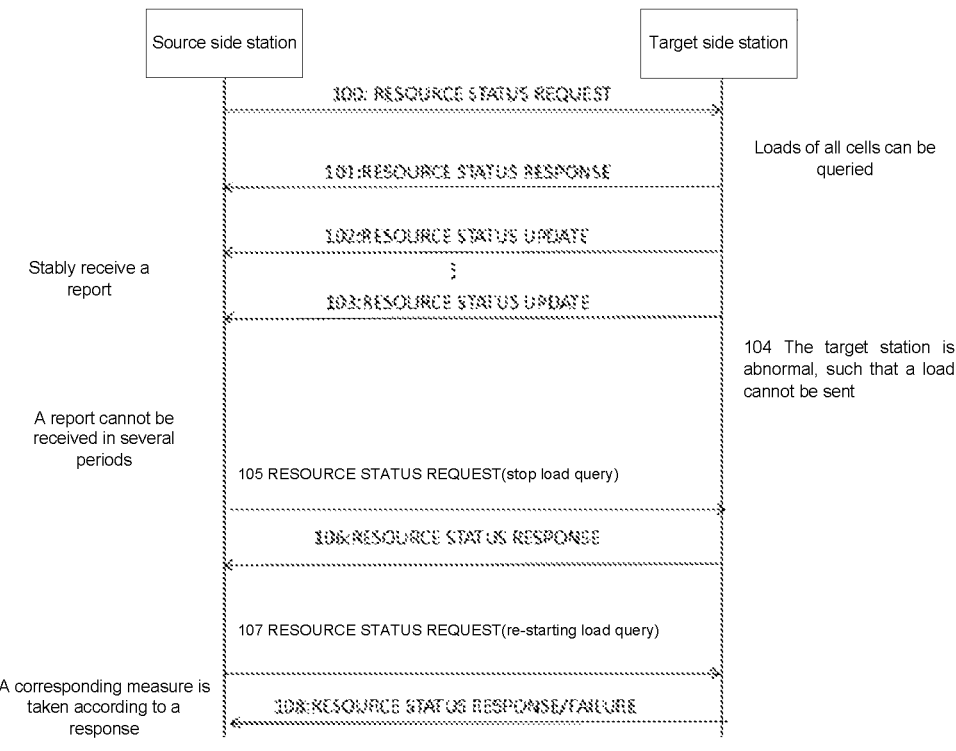
FIG. 7 is a flowchart of a scenario of unknown anomaly of a target base station according to an embodiment of the present disclosure.

Hereinafter, embodiments of the present disclosure are described in detail with reference to the accompanying drawings and in conjunction with the embodiments.

It should be noted that terms "first", "second" etc. in the description, claims, and accompanying drawings of the present disclosure are used to distinguish similar objects, and are not necessarily used to describe a specific sequence or order.

The method embodiments provided in the embodiments of the present disclosure can be executed in a mobile terminal, a computer terminal or a similar computing apparatus. Taking the method embodiments being executed on a mobile terminal as an example, FIG. 1 is a structural block diagram of hardware of a mobile terminal for a load query processing method according to embodiments of the present disclosure. As shown in FIG. 1, the mobile terminal may include: one or more (FIG. 1 shows only one) processors 102 (the processors 102 may include, but not limited to processing apparatus such as a micro processor, MCU or a programmable logic device, FPGA); and a memory 104 for storing data; wherein the mobile terminal can further include a transmission device 106 and an input/output device 108 for communication functions. A person of ordinary skill in the art would understand that the structure as shown in FIG. 1 is merely exemplary, and does not limit the structure of the mobile terminal. For example, the mobile terminal may also comprise more or fewer assemblies than those shown in FIG. 1, or have different configuration from that shown in FIG. 1.

The memory 104 may be used for storing a computer program, for example, a software program and module of application software, such as a computer program corresponding to the load query processing method in embodiments of the present disclosure; and the processor 102 executes various functional applications and service chain address pool slice processing by running the computer program stored in the memory 104, i.e. implementing the described method. The memory 104 may comprise a high-speed random access memory, and may also comprise a non-transitory memory, such as one or more magnetic storage apparatuses, flash memories or other non-transitory solid-state memories. In some examples, the memory 104 may further include memories remotely arranged with respect to the processors 102, and these remote memories may be connected to the mobile terminal via a network. Examples of the network include, but are not limited to the Internet, an intranet, a local area network, a mobile communication network and combinations thereof.

The transmission apparatus 106 is used to receive or send data via a network. Specific examples of the network may include a wireless network provided by a communication provider of the mobile terminal. In one example, the transmission apparatus 106 includes a network adapter (Network Interface Controller, NIC for short) which may be connected to other network devices by means of a base station, thereby being able to communicate with the Internet. In one example, the transmission apparatus 106 may be a Radio Frequency (RF for short) module which is configured to communicate with the Internet in a wireless manner.

The present embodiment provides a load query processing method running on the mobile terminal or a network architecture. FIG. 2 is a flowchart I of a load query processing method according to embodiments of the present disclosure. As shown in FIG. 2, the flow includes the following steps:

step S202, a load query response sent by a target base station and used for responding to a first load query request is received, wherein the load query request carries cell identifiers to be queried;

step S204, a load receiving situation of load receiving in each period within a preset number of periods is recorded;

step S206, a failure cell list for which load query fails is determined according to the load receiving situation and the load query response, wherein the failure cell list includes a failure cell identifier and a corresponding failure cause; and step S208, a failure cell corresponding to the failure cell identifier is processed according to the failure cell list.

Steps S202-S208 can solve the problem in the related art that cells with successful response and cells with failed response cannot be distinguished according to the content of the resource status response, which renders that a source base station cannot acquire the loads of some cells all the time, thereby affecting the service. A load receiving situation of load receiving in each period within a preset number of periods is recorded, a failure cell list for which load query fails is determined according to the load receiving situation and the load query response, and the failure cell list is processed, which can effectively reduce the effect of cells having failed response on the service.

In some exemplary embodiments, step S206 may specifically include:

S2061, in the case where the load is received in each period within the preset number of periods, and the load query response carries the failure cell list, the failure cell list is identified according to the load query response; and S2062, in the case where the load is received in each period within the preset number of periods, and the load query response does not carry the failure cell list, a failure cell identifier for which load query fails and the corresponding failure cause are determined according to the received load, and the failure cell identifier and the corresponding failure cause are added to the failure cell list.

In some optional embodiments, in step S2062, the step that a failure cell identifier for which load query fails and the corresponding failure cause are determined according to the received load may specifically include: a target cell identifier corresponding to the received load is acquired; in the case where the target cell identifier is not completely the same as the cell identifiers to be queried, the failure cell identifier of which the load has not been received is determined according to the cell identifiers to be queried; and the failure cause corresponding to the failure cell identifier is determined according to the failure cell identifier; and furthermore, a second load query request for acquiring a load of the failure cell identifier is sent to the target base station, wherein the second load query request carries the failure cell identifier; a load query failure report sent by the target base station is received, wherein the load query failure report carries the failure cause corresponding to the failure cell identifier; and the failure cell identifier and the corresponding failure cause are determined according to the load query failure report.

In some exemplary embodiments, step S206 can further include:

S2063, in the case where the load is not received in each period within the preset number of periods, a connection with the target base station is reestablished, and the load of each cell identifier to be queried is queried from the target base station according to the reestablished connection.

In some optional embodiments, the step S2063 may specifically include: a load query stopping request is sent to the target base station if the target cell identifier is completely the same as the cell identifiers to be queried; and after receiving a load query stopping response returned by the target base station, the load of each cell identifier to be queried is queried from the target base station in a manner of resending the first load query request to the target base station.

According to some other embodiments of the present disclosure, further provided is a load query processing method. FIG. 3 is a flowchart II of a load query processing method according to embodiments of the present disclosure. As shown in FIG. 3, the flow includes the following steps:

step S302, a first load query request sent by a source base station is received, wherein the load query request carries cell identifiers to be queried; and step S304, a load query response responding to the first load query request is sent to the source base station, wherein the load query response is used for instructing the source base station to record a load receiving situation of load receiving in each period within a preset number of periods, to determine a failure cell list for which load query fails according to the load receiving situation and the load query response, and process a failure cell corresponding to the failure cell identifier according to the failure cell list, wherein the failure cell list includes a failure cell identifier and a corresponding failure cause.

Steps S302-S304 can solve the problem in the related art that cells with successful response and cells with failed response cannot be distinguished according to the content of the resource status response, which renders that a source base station cannot acquire the loads of some cells all the time, thereby affecting the service. A load receiving situation of load receiving in each period within a preset number of periods is recorded, a failure cell list for which load query fails is determined according to the load receiving situation and the load query response, and the failure cell list is processed, which can effectively reduce the effect of cells having failed response on the service.

In some exemplary embodiments, in the case where the load is received in each period within the preset number of periods, and the load query response does not carry the failure cell list, a load of a target cell identifier is sent to the source base station, wherein the load of the target cell identifier is used for instructing the source base station to determine the failure cell identifier of which the load has not been received according to the cell identifiers to be queried in the case where the target cell identifier is not completely the same as the cell identifiers to be queried, to determine the failure cause corresponding to the failure cell identifier according to the failure cell identifier, and to add the failure cell identifier and the corresponding failure cause to the failure cell list; and in the case where the load is received in each period within the preset number of periods, and the load query response carries the failure cell list, the load query response is used for instructing the source base station to identify the failure cell list.

In some optional embodiments, the load of the failure cell can also be re-queried separately, a second load query request for acquiring a load of the failure cell identifier and sent by the source base station is received, wherein the second load query request carries the failure cell identifier; and a load query failure report is sent to the source base station, wherein the load query failure report is used for instructing the source base station to determine the failure cell identifier and the corresponding failure cause, and the load query failure report carries the failure cause corresponding to the failure cell identifier.

In some other exemplary embodiments, in the case where the load is not received in each period within the preset number of periods, a connection with the source base station is reestablished, and the load of each cell identifier to be queried is provided to the source base station according to the reestablished connection. Further, if the target cell identifier is completely the same as the cell identifiers to be queried, a load query stopping request sent by the source base station is received; and after returning a load query stopping response to the source base station, the load of each cell identifier to be queried is provided to the source base station in a manner of receiving the first load query request resent by the source base station.

In the present embodiment, after the source base station receives RESOURCE STATUS RESPONSE from the target base station, it is considered that at least loads of some cells can be acquired. Whether each cell receives a load in each period is recorded, and if a certain cell does not receive a load in several continuous periods, then it is considered that load acquisition of the cell is abnormal, and there may be two reasons: the target base station cannot acquire the load of the cell from the beginning to the end; and the target base station finds that the cell is suddenly abnormal, resulting in that the load cannot be acquired. For the two situations, a load query stopping request can be first sent to cells of which the loads cannot be acquired in several continuous periods, and these cells are deleted from an original measurement task. Then a load query start request is resent regarding these cells, and a new measurement task is established. If the load cannot be acquired due to the first reason, the source base station may know the reason why the load cannot be acquired, and may take specific measures for specific reasons. If the load cannot be acquired due to the second reason, a handshake relationship with the target base station can be re-established to re-acquire the load, so as to ensure normal operation of the source base station. FIG. 4 is a flowchart I of improving the reliability of an XN interactive load according to the present embodiment. As shown in FIG. 4, the flow includes:

step S401, a source base station records failure cells of which loads have not been received in several continuous periods;

step S402, the source base station sends a request to a target base station, and stops an original query task;

step S403, the source base station separates the failure cells of which loads cannot be acquired from an original cell request list, and sends a request, wherein the request is used for querying cells of which loads can be acquired;

step S404, the source base station places the failure cells of which loads cannot be acquired into another request task, to start a query process; and step S405, after receiving a failure response, the source base station performs corresponding processing according to a failure cause in the failure response.

With regard to a scenario in which load query of some cells fails and a scenario in which the target base station is abnormal, it can be ensured that the source base station re-establishes a connection with the target side station, and information on two parties is ensured to be equal, thereby preventing the source base station from always being unable to querying the loads of some cells without knowing the reason. The problem of query failure cannot be solved regarding specific reasons. And also, in a scenario in which the target base station is abnormal, handshake with the target base station can be quickly performed, to re-acquire the load. Normal operation of the service of the present-end station is ensured.

In the current information element of a load status response, i.e. RESOURCE STATUS RESPONSE, a failure cell list and a failure cause of each cell are newly added. In this way, after receiving the RESOURCE STATUS RESPONSE, the source side can perform corresponding processing on each failure cell according to the failure cell list. FIG. 5 is a flowchart II of improving the reliability of an XN interactive load according to the present embodiment. As shown in FIG. 5, the flow includes:

step S501, after receiving a load query request (which may specifically be a load status query request, i.e. RESOURCE STATUS REQUEST), a target base station processes cells carried in the request, and if a failure cell of which a load cannot be queried is found, the failure cell is placed in a failure list, and is sent to a source base station by a response, in which the failure list carries a failure cause; and step S502, after receiving a load query response (which may specifically be a load status response, i.e. RESOURCE STATUS RESPONSE), if the failure list is found, the source base station performs corresponding processing on the failure cell according to the failure cause carried in the failure list.

By the described steps, after the source base station receives the RESOURCE STATUS RESPONSE, the failure cell list and the failure cause can be identified at a first time, and thus the failure cell can be processed immediately without the need of other flows to identify the failure cell list and the failure cause.

A source side station (corresponding to the source base station) queries loads of cell1, cell2 and cell3 from a target side station (corresponding to the target base station) through an XN port. FIG. 6 is a flowchart I of a scenario in which a target base station successfully queries a load according to the present embodiment. As shown in FIG. 6, the flow includes:

step 100, a source side station sends a load status query request, i.e. RESOURCE STATUS REQUEST to start querying loads of cell1, cell2 and cell3;

step 101, after processing, a target side station can only provide loads of cell1 and cell2, and cannot acquire the load of cell3, and replies a load status response, i.e. RESOURCE STATUS RESPONSE to the source side station;

steps 102-103, the target side station periodically reports the loads of cell1, cell2, but the load of cell3 is not included;

step 104, the source side station finds that the load of cell3 cannot be acquired all the time, and stops original load query of cell1, cell2 and cell3;

step 105, the target station replies a query stopping success response;

step 106, the source side station places cells, i.e. the cell1 and the cell2 for which the loads have been successfully queried in a measurement task, starts a load query, and sends a RESOURCE STATUS REQUEST to start querying the loads of the cell1 and the cell2;

step 107, the target side can query the loads of cell1 and cell2, and replies a RESOURCE STATUS RESPONSE to the source side station;

step 108, the source side station independently places the cell3 which fails to be queried in a measurement task, starts a load query, and sends a RESOURCE STATUS REQUEST to start querying the load of the cell3; and step 109, the target side cannot query the load of cell3, returns a load status error, i.e. RESOURCE STATUS FAILURE, and carries a failure cause. The source side station may take a corresponding measure according to the failure cause.

The source side station queries loads of cell1, cell2 and cell3 from the target side station through an XN port. FIG. 7 is a flowchart of a scenario of unknown anomaly of a target base station according to the present embodiment. As shown in FIG. 7, the flow includes:

step 100, a source side station sends a RESOURCE STATUS REQUEST to start querying loads of cell1, cell2 and cell3;

step 101, after processing, a target side station can provide the loads of cell1, cell2 and cell3, and return a RESOURCE STATUS RESPONSE to the source side station;

steps 102-103, the target side station periodically reports the loads of cell1, cell2 and cell3;

step 104, the target side station is suddenly abnormal and cannot provide loads;

step 105, the source side station finds that the loads cannot be acquired in several periods, and sends a load query stopping request;

step 106, the target station replies a stopping success response;

step 107, the source side station re-queries the loads of cell1, cell2 and cell3, sends a request, and re-establishes a relationship with the target station; and step 108, the target station replies a success or failure response. The source side station performs response processing according to the response.

Figure 8:
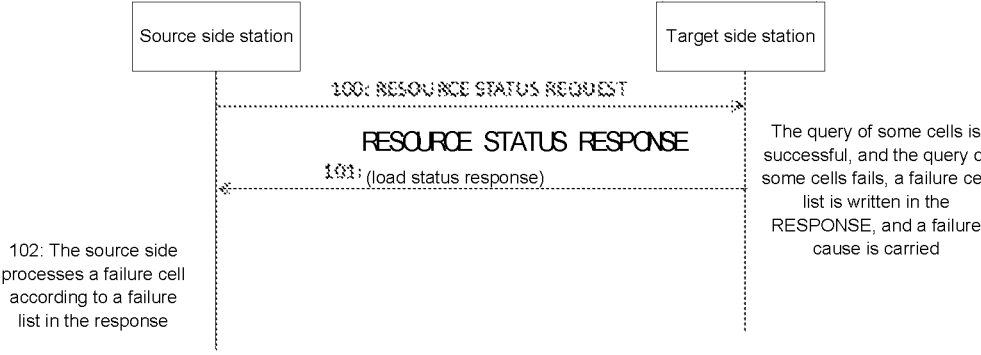
FIG. 8 is a flowchart II of a scenario in which a target base station successfully queries a load according to an embodiment of the present disclosure.

The source side station queries loads of cell1, cell2 and cell3 from the target side station through an XN port. FIG. 8 is a flowchart II of a scenario in which a target base station successfully queries a load according to the present embodiment. As shown in FIG. 8, the flow includes:

step 100, a source side station sends a RESOURCE STATUS REQUEST to start querying loads of cell1, cell2 and cell3;

step 101, after processing, a target side station can provide loads of cell1 and cell2, and cannot acquire the load of cell3, and replies a RESOURCE STATUS RESPONSE to the source side station; and the target side station places cell3 in a failure list and carries a failure cause, wherein the failure list and the failure cause are carried in the RESOURCE STATUS RESPONSE; and step 102, The source side station processes the failure cell according to the failure cell list and the failure cause.

Figure 9:
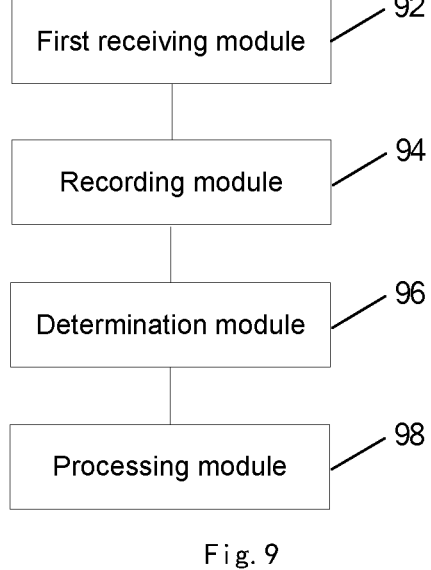
FIG. 9 is a block diagram I of a load query processing apparatus according to an embodiment of the present disclosure.

According to some other embodiments of the present disclosure, further provided is a load query processing apparatus. FIG. 9 is a block diagram I of a load query processing apparatus according to the present embodiment. As shown in FIG. 9, the apparatus includes:

a first receiving module 92, configured to receive a load query response sent by a target base station and used for responding to a first load query request, wherein the load query request carries cell identifiers to be queried;

a recording module 94, configured to record a load receiving situation of load receiving in each period within a preset number of periods;

a determination module 96, configured to determine a failure cell list for which load query fails according to the load receiving situation and the load query response, wherein the failure cell list includes a failure cell identifier and a corresponding failure cause; and a processing module 98, configured to process a failure cell corresponding to the failure cell identifier according to the failure cell list.

In some exemplary embodiments, the determination module 96 comprises:

an identification sub-module, configured to identify the failure cell list according to the load query response in a case where the load is received in each period within the preset number of periods, and the load query response carries the failure cell list; and a determination sub-module, configured to determine a failure cell identifier for which load query fails and the corresponding failure cause according to the received load in a case where the load is received in each period within the preset number of periods, and the load query response does not carry the failure cell list, and add the failure cell identifier and the corresponding failure cause to the failure cell list.

In some exemplary embodiments, the determination sub-module includes:

an acquisition unit, configured to acquire a target cell identifier corresponding to the received load;

a first determination unit, configured to determine the failure cell identifier of which the load has not been received according to the cell identifiers to be queried in the case where the target cell identifier is not completely the same as the cell identifiers to be queried; and a second determination unit, configured to determine the failure cause corresponding to the failure cell identifier according to the failure cell identifier.

In some exemplary embodiments, the second determination unit is further configured to send a second load query request for acquiring a load of the failure cell identifier to the target base station, wherein the second load query request carries the failure cell identifier;

receive a load query failure report sent by the target base station, wherein the load query failure report carries the failure cause corresponding to the failure cell identifier; and determine the failure cell identifier and the corresponding failure cause according to the load query failure report.

In some exemplary embodiments, the determination module 96 comprises:

a query sub-module, configured to reestablish a connection with the target base station in the case where the load is not received in each period within the preset number of periods, and query the load of each cell identifier to be queried from the target base station according to the reestablished connection.

In some exemplary embodiments, the query sub-module includes:

a sending unit, configured to send a load query stopping request to the target base station if the target cell identifier is completely the same as the cell identifiers to be queried; and a query unit, configured to query the load of each cell identifier to be queried from the target base station in a manner of resending the first load query request to the target base station after receiving a load query stopping response returned by the target base station.

Figure 10:
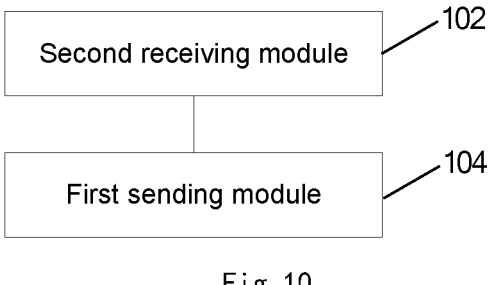
FIG. 10 is a block diagram II of a load query processing apparatus according to an embodiment of the present disclosure.

According to some other embodiments of the present disclosure, further provided is a load query processing apparatus. FIG. 10 is a block diagram II of a load query processing apparatus according to the present embodiment. As shown in FIG. 10, the apparatus includes:

a second receiving module 102, configured to receive a first load query request sent by a source base station, wherein the load query request carries cell identifiers to be queried; and a first sending module 104, configured to send a load query response responding to the first load query request to the source base station, wherein the load query response is used for instructing the source base station to record a load receiving situation of load receiving in each period within a preset number of periods, to determine a failure cell list for which load query fails according to the load receiving situation and the load query response, and process a failure cell corresponding to the failure cell identifier according to the failure cell list, wherein the failure cell list includes a failure cell identifier and a corresponding failure cause.

In some exemplary embodiments, the apparatus further includes:

a second sending module, configured to: send a load of a target cell identifier to the source base station in the case where the load is received in each period within the preset number of periods, and the load query response does not carry the failure cell list, wherein the load of the target cell identifier is used for instructing the source base station to determine the failure cell identifier of which the load has not been received according to the cell identifiers to be queried in the case where the target cell identifier is not completely the same as the cell identifiers to be queried, to determine the failure cause corresponding to the failure cell identifier according to the failure cell identifier, and to add the failure cell identifier and the corresponding failure cause to the failure cell list; and in the case where the load is received in each period within the preset number of periods, and the load query response carries the failure cell list, the load query response is used for instructing the source base station to identify the failure cell list.

In some exemplary embodiments, the apparatus further includes:

a third receiving module, configured to receive a second load query request for acquiring a load of the failure cell identifier and sent by the source base station, wherein the second load query request carries the failure cell identifier; and a third sending module, configured to send a load query failure report to the source base station, wherein the load query failure report is used for instructing the source base station to determine the failure cell identifier and the corresponding failure cause, and the load query failure report carries the failure cause corresponding to the failure cell identifier.

In some exemplary embodiments, the apparatus further includes:

a connection establishment module, configured to reestablish a connection with the source base station in the case where the load is not received in each period within the preset number of periods, and provide the load of each cell identifier to be queried to the source base station according to the reestablished connection.

In some exemplary embodiments, the connection establishment module comprises:

a receiving sub-module, configured to receive a load query stopping request sent by the source base station if the target cell identifier is completely the same as the cell identifiers to be queried; and a providing sub-module, configured to provide the load of each cell identifier to be queried to the source base station in a manner of receiving the first load query request resent by the source base station after returning a load query stopping response to the source base station.

Embodiments of the present disclosure further provide a computer-readable storage medium, the computer-readable storage medium storing a computer program, wherein the computer program is configured to execute the steps in any one of the method embodiments when running.

In some exemplary embodiments, the computer-readable storage medium may include, but is not limited to: any medium that can store a computer program, such as a USB flash drive, a Read-Only Memory (ROM for short), a Random Access Memory (RAM for short), a removable hard disk, a magnetic disk, or an optical disc.

Embodiments of the present disclosure further provide an electronic apparatus, including a memory and a processor; wherein the memory stores a computer program, and the processor is configured to run the computer program to execute the steps in any one of the method embodiments.

In some exemplary embodiments, the electronic apparatus can further include a transmission device and an input/output device, wherein the transmission device is connected to the processor, and the input/output device is connected to the processor.

For specific examples in the present embodiment, reference can be made to the examples described in the embodiments and exemplary embodiments, and thus they will not be repeated again in the present embodiment.

It is apparent that a person skilled in the art shall understand that all of the modules or steps in the present disclosure may be implemented by using a general computing apparatus, may be centralized on a single computing apparatus or may be distributed on a network composed of multiple computing apparatuses, and may be implemented by using executable program codes of the computing apparatus. Thus, the program codes may be stored in a storage apparatus and executed by the computing apparatus, and in some cases, the shown or described steps may be executed in a sequence different from that shown herein, or the modules or steps are manufactured into integrated circuit modules, or multiple modules or steps therein are manufactured into a single integrated circuit module for implementation. Thus, the present disclosure is not limited to any specific hardware and software combinations.

The content above merely relates to preferred embodiments of the present disclosure, and is not intended to limit the present disclosure. For a person skilled in the art, the present disclosure may have various modifications and changes. Any modifications, equivalent replacements, improvements, etc. made within the principle of the present disclosure shall all fall within the scope of protection of the present disclosure.

What is claimed is:

1. A load query processing method, comprising:

receiving a load query response sent by a target base station and used for responding to a first load query request, wherein the load query request carries a cell identifier to be queried;

recording a load receiving situation of load receiving in each period within a preset number of periods;

determining a failure cell list for which load query fails according to the load receiving situation and the load query response, wherein the failure cell list comprises a failure cell identifier and a corresponding failure cause; and processing a failure cell corresponding to the failure cell identifier according to the failure cell list;

wherein determining a failure cell list for which load query fails according to the load receiving situation and the load query response comprises:

identifying the failure cell list according to the load query response in a case where the load is received in each period within the preset number of periods, and the load query response carries the failure cell list; and determining a failure cell identifier for which load query fails and the corresponding failure cause according to the received load in the case where the load is received in each period within the preset number of periods, and the load query response does not carry the failure cell list, and adding the failure cell identifier and the corresponding failure cause to the failure cell list.

2. The method according to claim 1, wherein determining a failure cell identifier for which load query fails and the corresponding failure cause according to the received load comprises:

acquiring a target cell identifier corresponding to the received load;

determining the failure cell identifier of which the load has not been received according to the cell identifiers to be queried in a case where the target cell identifier is not completely the same as the cell identifiers to be queried; and determining the failure cause corresponding to the failure cell identifier according to the failure cell identifier.

3. The method according to claim 2, wherein determining the corresponding failure cause of the failure cell identifier according to the failure cell identifier comprises:

sending a second load query request for acquiring a load of the failure cell identifier to the target base station, wherein the second load query request carries the failure cell identifier;

receiving a load query failure report sent by the target base station, wherein the load query failure report carries the failure cause corresponding to the failure cell identifier; and determining the failure cell identifier and the corresponding failure cause according to the load query failure report.

4. The method according to claim 1, wherein determining a failure cell list for which load query fails according to the load receiving situation and the load query response comprises:

reestablishing a connection with the target base station in a case where the load is not received in each period within the preset number of periods, and querying the load of each cell identifier to be queried from the target base station according to the reestablished connection.

5. The method according to claim 4, wherein reestablishing a connection with the target base station, and querying the load of each cell identifier to be queried from the target base station according to the reestablished connection comprise:

sending a load query stopping request to the target base station if the target cell identifier is completely the same as the cell identifiers to be queried; and querying the load of each cell identifier to be queried from the target base station in a manner of resending the first load query request to the target base station after receiving a load query stopping response returned by the target base station.

6. A load query processing method, the method comprising:

receiving a first load query request sent by a source base station, wherein the load query request carries a cell identifier to be queried; and sending a load query response responding to the first load query request to the source base station, wherein the load query response is used for instructing the source base station to record a load receiving situation of load receiving in each period within a preset number of periods, to determine a failure cell list for which load query fails according to the load receiving situation and the load query response, and process a failure cell corresponding to the failure cell identifier according to the failure cell list, wherein the failure cell list comprises a failure cell identifier and a corresponding failure cause;

wherein the method further comprises:

sending a load of a target cell identifier to the source base station in the case where the load is received in each period within the preset number of periods, and the load query response does not carry the failure cell list, wherein the load of the target cell identifier is used for instructing the source base station to determine the failure cell identifier of which the load has not been received according to the cell identifiers to be queried in the case where the target cell identifier is not completely the same as the cell identifier to be queried, to determine the failure cause corresponding to the failure cell identifier according to the failure cell identifier, and to add the failure cell identifier and the corresponding failure cause to the failure cell list; and wherein in a case where the load is received in each period within the preset number of periods, and the load query response carries the failure cell list, the load query response is used for instructing the source base station to identify the failure cell list.

7. The method according to claim 6, wherein the method further comprises:

receiving a second load query request for acquiring a load of the failure cell identifier and sent by the source base station, wherein the second load query request carries the failure cell identifier; and sending a load query failure report to the source base station, wherein the load query failure report is used for instructing the source base station to determine the failure cell identifier and the corresponding failure cause, and the load query failure report carries the failure cause corresponding to the failure cell identifier.

8. The method according to claim 6, wherein the method further comprises:

reestablishing a connection with the source base station in the case where the load is not received in each period within the preset number of periods, and providing the load of each cell identifier to be queried to the source base station according to the reestablished connection.

9. The method according to claim 8, wherein reestablishing a connection with the source base station, and providing the load of each cell identifier to be queried to the source base station according to the reestablished connection comprise:

receiving a load query stopping request sent by the source base station when the target cell identifier is completely the same as the cell identifiers to be queried; and providing the load of each cell identifier to be queried to the source base station in a manner of receiving the first load query request resent by the source base station after returning a load query stopping response to the source base station.

10. A load query processing apparatus, comprising:

a first receiving module, configured to receive a load query response sent by a target base station and used for responding to a first load query request, wherein the load query request carries cell identifiers to be queried;

a recording module, configured to record a load receiving situation of load receiving in each period within a preset number of periods;

a determination module, configured to determine a failure cell list for which load query fails according to the load receiving situation and the load query response, wherein the failure cell list comprises a failure cell identifier and a corresponding failure cause; and a processing module, configured to process a failure cell corresponding to the failure cell identifier according to the failure cell list;

wherein the determination module comprises:

an identification sub-module, configured to identify the failure cell list according to the load query response in a case where the load is received in each period within the preset number of periods, and the load query response carries the failure cell list; and a determination sub-module, configured to determine a failure cell identifier for which load query fails and the corresponding failure cause according to the received load in a case where the load is received in each period within the preset number of periods, and the load query response does not carry the failure cell list, and add the failure cell identifier and the corresponding failure cause to the failure cell list.

11. A non-transitory computer-readable storage medium, the storage medium storing a computer program, wherein the computer program is configured to execute, when running, the method according to claim 1.

12. An electronic apparatus, comprising a memory and a processor; wherein the memory stores a computer program, and the processor is configured to run the computer program so as to execute the method according to claim 1.

13. An electronic apparatus, comprising a memory and a processor; wherein the memory stores a computer program, and the processor is configured to run the computer program so as to execute the method according to claim 1.

14. An electronic apparatus, comprising a memory and a processor; wherein the memory stores a computer program, and the processor is configured to run the computer program so as to execute the method according to claim 2.

15. An electronic apparatus, comprising a memory and a processor; wherein the memory stores a computer program, and the processor is configured to run the computer program so as to execute the method according to claim 3.

16. An electronic apparatus, comprising a memory and a processor; wherein the memory stores a computer program, and the processor is configured to run the computer program so as to execute the method according to claim 4.

17. An electronic apparatus, comprising a memory and a processor; wherein the memory stores a computer program, and the processor is configured to run the computer program so as to execute the method according to claim 5.

18. An electronic apparatus, comprising a memory and a processor; wherein the memory stores a computer program, and the processor is configured to run the computer program so as to execute the method according to claim 6.

* * * * *